United States Patent [19]

London et al.

[11] Patent Number: 4,471,348

[45] Date of Patent: Sep. 11, 1984

[54] METHOD AND APPARATUS FOR SIMULTANEOUSLY DISPLAYING DATA INDICATIVE OF ACTIVITY LEVELS AT MULTIPLE DIGITAL TEST POINTS IN PSEUDO REAL TIME AND HISTORICAL DIGITAL FORMAT, AND DISPLAY PRODUCED THEREBY

[75] Inventors: Charles A. London, Bellevue; Roland A. Strolis, Kirkland, both of Wash.

[73] Assignee: The Boeing Company, Seattle, Wash.

[21] Appl. No.: 339,486

[22] Filed: Jan. 15, 1982

[51] Int. Cl.³ .............................................. G09G 1/16
[52] U.S. Cl. ................................ 340/722; 324/121 R; 340/521; 364/551
[58] Field of Search ............... 340/521, 721, 722, 715; 364/151, 178, 551; 324/121 R

[56] References Cited

U.S. PATENT DOCUMENTS

| Re. 30,298 | 6/1980 | Keller | 364/551 X |
| 3,406,387 | 10/1968 | Werme | 340/711 X |
| 3,725,901 | 4/1973 | Lehari et al. | 340/722 |
| 4,303,973 | 12/1981 | Williamson et al. | 340/722 X |

Primary Examiner—David L. Trafton
Attorney, Agent, or Firm—Hughes, Barnard & Cassidy

[57] ABSTRACT

A digital test point monitoring system for continuously monitoring n digital test points (where "n" is any desired whole integer)—test points which may, for example, be associated with m data processors, computer processing units (CPU's), machine tool controls, or any similar control system (where "m" is any desired whole integer)—and dynamically acquiring n signal values which may, for example, be indicative of performance, utilization (activity) levels, or similar data point parameters; processing such n signal values; and, simultaneously displaying y of such processed n signal values (where "y" is any whole integer from "1" to on the order of "8") on a living display containing y discrete independent channels of digital information each portraying a pseudo real time digital representation of the monitored signal values and a digitally pictorial historic representation of previously monitored signal values over a preselected period of time ranging up to on the order of 90 minutes, or more; and the digital display produced thereby; whereby the user may, at a glance, determine: (i) the present state of utilization (or other desired operating parameter) of y discrete independent channels of digital information; and (ii), the historical trend of such displayed parameters for each of the selected y discrete independent channels of digital information over any given selected period of time. The system and display readily permit of: (i) annotation with date, time-of-day, channel identification and/or other comments and/or annotations; (ii) acquisition and display of data from remote locations; (iii) transmission of displayed data to remote locations; and (iv), recording of displayed data in hardcopy and/or magnetic media format; all under the control of a programmable microprocesor based control.

57 Claims, 6 Drawing Figures

METHOD AND APPARATUS FOR SIMULTANEOUSLY DISPLAYING DATA INDICATIVE OF ACTIVITY LEVELS AT MULTIPLE DIGITAL TEST POINTS IN PSEUDO REAL TIME AND HISTORICAL DIGITAL FORMAT, AND DISPLAY PRODUCED THEREBY

BACKGROUND OF THE INVENTION

1. Field of the Invention

The present invention relates, in general, to a system for monitoring multiple digital test points on a continuous dynamic basis and for acquiring signal values representative of, for example, performance, activity level, or other suitable operating parameter indicative of the operational status of each digital test point, all without imposition of any physical load on the digital test points or on the equipment with which such points are associated, and for displaying such dynamically acquired information after processing thereof on both a pseudo real time digital basis and on a digitally pictorial historic basis extending over a preselected period of time; and, more particularly, to a monitoring/display system of the foregoing character, and the display produced thereby, where any desired number n of discrete totally independent digital test points (where "n" is any whole integer) can be simultaneously monitored, the resulting n signal values processed, and any selected group of y of the monitored n signal values (where "y" is any whole integer ranging from "1" to on the order of "8") can be simultaneously displayed on a single living display (or on each of multiple living displays) as y independent discrete channels of information each displaying a pseudo real time digital portrayal of the status of the operational parameter being monitored and an historical digital portrayal of the status of that parameter over the most recent period of time of interest, which may range up to 90 minutes or more.

By "living display", it is meant that the current information is displayed on a pseudo real time basis with the oldest historical displayed information being progressively scrolled off the visual display as new current information is displayed for the first time. By "pseudo real time", it is meant that in its broadest aspects the invention permits averaging of successive signal values measured over a given time period and display of the averaged value as contrasted with the instantaneous value.

For example, the present invention is hereafter described in connection with an exemplary monitoring system for measuring the activity level of multiple digital test points wherein each test point is scanned over successive time intervals on the order of 5 seconds each, and with successive scans being averaged over a selected time interval such, for example, as 45 seconds, with the digital information actually displayed being respresentative of the average of the signal value over the preceding 45 second time interval (or other selected time interval). As the ensuring description proceeds, however, those skilled in the art will appreciate that the particular time intervals employed are a matter of choice and a function of the accuracy and resolution desired for the information being displayed. That is, while the invention is here described in connection with an exemplary system for continuously monitoring the activity level status for n digital test points and displaying y channels of the monitored information on a pseudo real time basis and an historical basis over the preceding 90 minute period, the system can be readily programmed or reprogrammed to either extend or shorten the historic time period and, concomitantly, to extend or shorten the incremental periods over which the monitored information is averaged.

2. Prior Art

As more and more highly sophisticated and expensive data processing systems, CPU's, computer controlled machine tools, and the like, have been developed, there has been an ever increasing demand for systems and procedures to insure that such capital intensive equipment is utilized to its fullest potential. The prior art is replete with numerous disclosures of efforts to monitor such sophisticated equipment for a wide range of reasons. Typical of such prior art approaches are those disclosed in, for example, U.S. Letters Pat. Nos. 3,399,298-Taylor, 3,522,597-Murphy, 3,540,003-Murphy, 3,585,599-Hitt et al, 3,599,091-Warner, Jr., 3,771,131-Ling, and 3,818,458-Deese.

In the Taylor patent, the patentee discloses a system for measuring the efficiency of a given data processor when operating with a given program so as to permit program revision where necessary to make better use of the data processor. A secondary computer serves to drive the display device.

Murphy, in his aforesaid U.S. Pat. No. 3,540,003, discloses a special purpose digital collection system for computer monitoring. The disclosure pertains particularly to the data collection process, employing associative memory techniques, comparators, and a computer for detailed analysis of the digitally collected data. In Murphy's U.S. Pat. No. 3,522,597, the patentee discloses the use of a cathode ray tube (CRT) display of analog information.

Hitt et al, disclose a digital hardware control system for monitoring digital test points in a CPU; while Warner discloses the use of isolation probes to sense digital signals in a computer system without imposing line loads and without degrading system performance. In the Ling patent, probes are permanently hardwired to the computer; and, time variable data is captured using timing signals from the computer being monitored.

Deese discloses methods and apparatus for monitoring the utility and performance of a general purpose computer without affecting operation of the computer by sensing changes in the operative state of the computer and capturing the contents of certain status registers and locations in memory and in response to such sensed changes.

Perhaps the most pertinent of the known patented prior art disclosures is that contained in U.S. Letters Pat. No. 3,588,837-Rash et al. This patent is specifically directed to a system for determining the activity level of multiple data paths and/or other signals. To accomplish this, the patentees accumulate signals in analog or digital form from the CPU of interest, process the signals to produce outputs indicative of the percent utilization of the CPU channel inputs, store the processed information first in a temporary memory and then in a main computer memory, and ultimately permit retrieval of stored information from the main computer memory and display thereof on a CRT screen. The system appears capable of displaying only one channel of information at a time rather than multiple channels; display requires operator intervention; and, the system appears to be incapable of simultaneously displaying: (i) multiple independent discrete channels of information on a single display; and/or (ii), information on both a real time or pseudo real time digital basis and on a digital historic basis.

Another known prior approach comprises an experimental system heretofore employed by the assignee of the present invention. In that experimental system, data representative of percent utilization of multiple CPU channels was displayed by means of a continuous strip chart recorder employing multiple pens for scribing multiple, generally parallel, vertical continuous traces on a scrolled paper sheet with the traces being indicative of the percent utilization of each CPU channel of interest. The information was not presented in digital format; but, rather, in map format. The physical paper trace was monitored by video cameras and replicated at remote video monitors.

In general all of the foregoing prior art approaches are characterized by their complexity and are relatively costly. The known patented systems are generally not intended to simultaneously display multiple discrete independent channels of information on a single visual display, nor is the display comprised of a real time or pseudo real time display coupled with a scrolled living historical display. In general, such systems do not permit of instantaneous recognition of trend data for multiple channels of interest, nor do they provide display with programmed annotations of interest.

SUMMARY OF THE INVENTION

Accordingly it is a general aim of the present invention to provide a reliable, simple and economical system for monitoring digital test points and the like which overcomes the disadvantages inherent with the known complex and expensive prior art systems and which, at the same time, is characterized by its flexibility and permits display of information in readily usable digital format, both on a pseudo real time basis and on an historical basis.

In another of its important aspects, it is an object of the invention to provide a simple low-cost monitoring system which can be readily constructed using commercially available tested and proven conventional off-the-shelf components; yet, which permits simultaneous display of information of interest for up to on the order of eight discrete independent channels of interest—information that may readily be derived by monitoring a plurality of digital test points associated with one or more devices being monitored such, for example as data processors, CPU's, machine tool controls, or the like—and where the information pertinent to each of such information channels is simultaneously displayed on a single living display reflecting current or pseudo real time data and the most recent historical data displayed over a preselected time interval, with the oldest of such historical data being progressively scrolled off of the living display as current data is entered thereon for the first time.

A further object of the invention is to provide methods and apparatus for monitoring a plurality of digital test points associated with one or more data processors, CPU's, or similar devices and employing passive instrumentation to capture data of interest so that the monitoring system does not impose any physical load on the devices being monitored and does not utilize any resources of such devices, thereby insuring the continued operation of the device being monitored without any degradation thereof.

Yet another important objective of the invention is the provision of a general purpose monitoring system which finds applicability in measuring performance levels, percent utilization or activity, or other desired operational parameters of a wide range of systems including, but not limited to, data processors, CPU's, machine tool controls, power substations, irrigation controls and the like.

In yet another of its important aspects, it is a general aim of the invention to provide a compact informative display of multiple discrete independent information data channels on a single display which permits a great deal of digital data to be condensed and automatically displayed in readable and easily understood format.

In this connection, it is a more detailed objective of the invention to provide an improved living display which may be presented locally and/or remotely at one or more locations and which is indicative of performanc, percentage utilization or activity, or other such operating parameter associated with y discrete individual digital test points (where "y" can be any whole integer from "1" to on the order of "8") in one or more data processors or the like and which permits easy readability of each monitored parameters for each discrete independent one of the information channels associated with the n digital test points simultaneously from data presented on a single living display in: (i) alphanumeric digital pseudo real time format; and (ii), a pictorial digital historical bar or strip chart format for a preselected historical period ranging from a few seconds up to on the order of the most recent 90 minute time interval, or more; all with or without additional annotation; so as to permit display of trend data associated with each different digital test point being monitored. Attainment of this objective permits managers or other supervisors to have virtually instantaneous access to both current data and recent historical data emanating from a plurality of discrete independent digital test points, thereby enhancing the decision-making process and/or permitting prompt investigation with respect to any given information channel displaying performance levels less than optimum or less than anticipated.

In another of its more detailed aspects, it is an object of the invention to provide a digital test point monitoring system which permits simultaneous display of multiple discrete independent data information channels in both digital pseudo real time and digital historic format on the screen(s) of one or more CRT's and/or in hardcopy format generated by conventional printer/plotters, and/or where the information being collected can be readily stored on magnetic media or the like so as to permit subsequent retrieval in the event of system failure or simply when one desires access to historical data dating back prior to the historical data contained on the living display.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Figure 1:
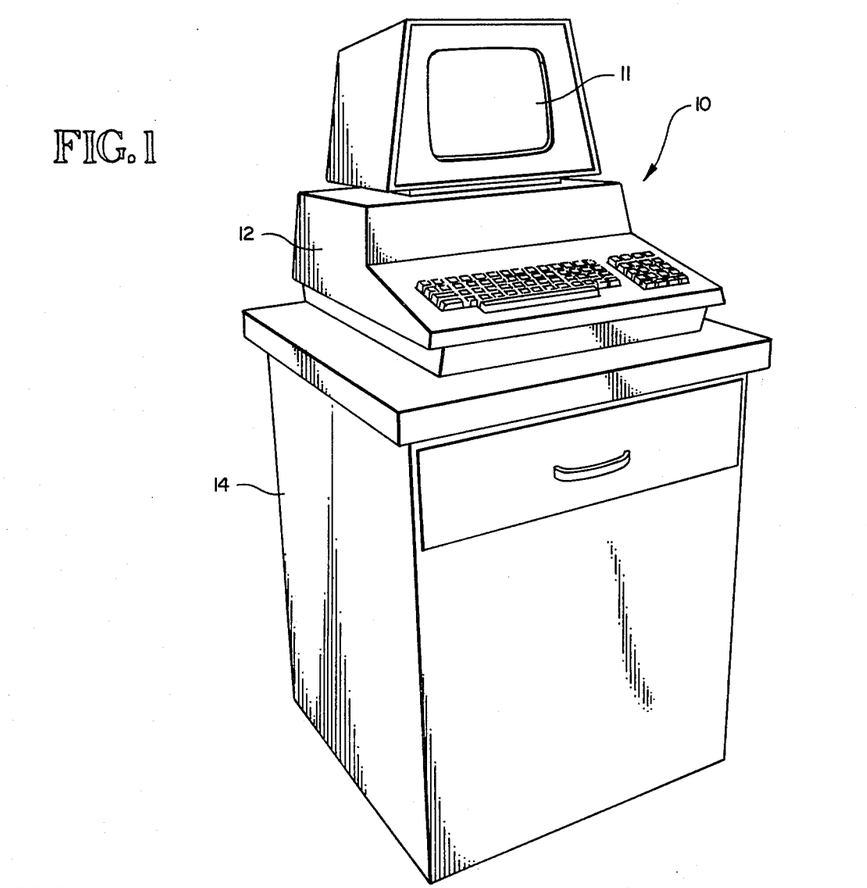
FIG. 1 is a perspective view of an exemplary embodiment of the present invention, here illustrating particularly a typical installation for housing the electronic components of the system and for supporting a conventional keyboard and CRT type display terminal.

Turning now to the drawings, there has been illustrated in FIG. 1 an exemplary form of apparatus for use with monitoring systems embodying the features of the present invention as might be used to monitor, for example, the percent utilization of selected and selectable ones of a plurality of independent discrete digital test points associated with one or more data processors, CPU's, machine tool controls, or other appropriate control systems. As here shown, the exemplary apparatus, generally indicated at 10, includes a conventional CRT display means 11, a keyboard 12 for entering desired program information into a microprocessor controlled central processor (not shown in FIG. 1), and a cabinet 14 for housing the various mechanical, electrical and electronic system components.

Figure 2:
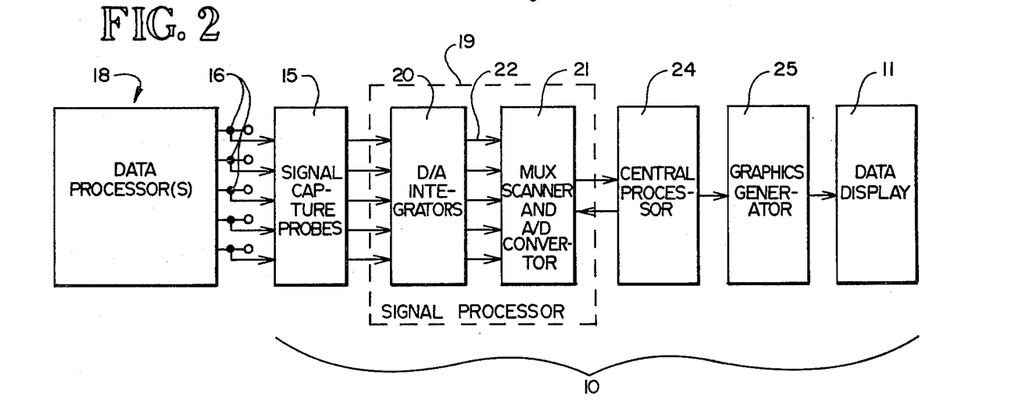
FIG. 2 is a highly simplified block diagram of the exemplary form of the invention shown in FIG. 1, but here illustrating particularly the flow of information from a plurality of digital test points associated with a data processor or the like through a signal processor under the control of a preprogrammed and programmable microprocessor controlled central processor, and thence to a data display via a graphics generator.

In accordance with one of the important aspects of the present invention, and as illustrated in general block diagram form in FIG. 2, the exemplary apparatus 10 of the present invention is provided with a plurality of signal capture probes 15 suitable for interconnection to respective different ones of a plurality of n digital test points 16 (where "n" is any desired whole integer) which may, for example, be associated with one or more data processors, CPU's, machine tool controls, or similar control systems or other peripherals, here generally indicated at 18. As the ensuing description proceeds, those skilled in the art will appreciate that the exemplary apparatus or system 10, herein sometimes referred to as a "Trace Digital Display System" monitor ("TDDS"), may be configured in various ways dependent upon the particular environment within which the installation is to be used. For example, the system 10 may be configured as a "standalone" monitoring system which can be readily moved to the site of the system to be monitored, thereby providing advantages of portability and flexibility. However, whether used as a "standalone" system or otherwise, the exemplary form of the invention preferably includes, or is used in conjunction with, a plurality of conventional high impedance probes 15 which may be remotely located and which are capable of acquiring signal values—normally digital signal values—embedded at a corresponding plurality of n digital test points 16 without imposing any physical load on either the digital test points 16 or on the data processor(s) or other system(s) 18 being monitored; and, without in any way subjecting the signal values at such points to signal degradation. Such conventional high impedance probes 15 include transmission driver circuits which transmit the acquired signal waveform to a signal processor; and, are available from various sources. However, excellent results have been obtained in the practice of the present invention when employing high impedance probes of the type commercially available from either Testdata Systems Corporation of McLean, Va., or TITN, Inc. of Bloomington, Minn.

In carrying out the exemplary form of the invention, the plurality of digital signal values—herein referred to as "n signal values" where "n" is any desired whole integer—which typically comprise a pulse train of unspecified frequency, are input to a signal processor 19 containing n pressure digital-to-analog integrators 20 and a multiplexor/scanner analog-to-digital converter system 21. The n digital-to-analog integrators 20 respectively connected to the n high impedance probes 15 serve to integrate the n digital signal values, producing n analog output signals on n lines 22 which are respectively proportional to the integrated value of the n signal values captured by the n probes 15, thereby permitting display of information indicative of the activity levels of the n signal values derived from the n digital test points. To permit this, the n analog signal values on lines 22 are scanned by the multiplexor/scanner 21 and converted into digital signal values, all under the control of a microprocessor controlled central processor 24, with the thus processed signal values being routed to a graphics generator 25 for selected display on a suitable living data display such, for example, as a CRT 11 (FIGS. 1 and 2).

In accordance with another of the important aspects of the present invention, the acquired and processed signal data representative of certain only selected ones of the n digital test points 16 are displayed on a living display in such a manner that an observer can, merely at a glance, readily determine both: (i) the current activity status of the selected ones of the n digital test points; and (ii), the most recent historical status of activity levels for each selected digital test point over a given selected period of time; thereby enabling the observer to detect whether the current status is at an acceptable level, what the trend of activity levels for that test point has been, and to investigate and/or correct any operational abnormalities detected. Again, it will be understood that the actual appearance of the data to be displayed can vary widely within the scope of the present invention, and the particular display (FIG. 3) described hereinbelow has been set forth for exemplary purposes only.

Figure 3:
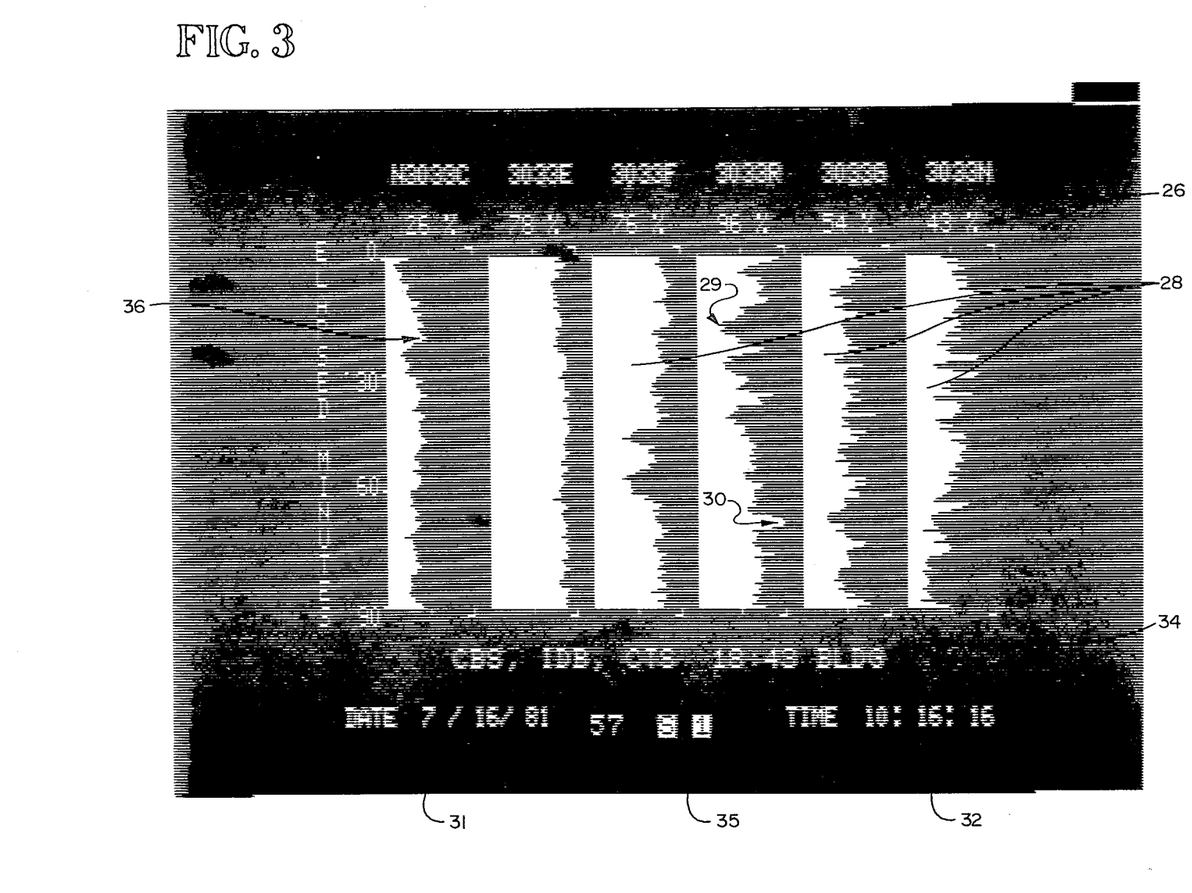
FIG. 3 is a photographic reproduction of the information displayed on the face of a CRT included in an exemplary monitoring system embodying the features of the present invention, with such exemplary living display reflecting in digital format percent utilization (activity) of six independent and discrete digital test points associated with six different CPU's, with each of the six information channels containing: (i) an alphanumeric pseudo real time indication of percent utilization; and (ii), a digital historic representation of utilization extending over an elapsed time interval of 90 minutes; with the overall living display containing alphanumeric annotations identifying the particular digital test points being displayed, the location of the display, date, time and other information of interest.

Thus, referring to FIG. 3, there has been depicted a photographic reproduction of the face of a CRT 11 (Cf., FIGS. 1 and 2) illustrating in digital format the current and historical status in terms of activity level expressed as percentage utilization for each of six (6) different digital test points which are here associated with six (6) different large scale "3033" IBM computers respectively identified across the top of the display by the designations "N3033C", "3033E", "3033F", "3033R", "3033G", and "3033N". It will be noted that each different one of the illustrated six CPU digital test point status representations includes: (i) an alphanumeric presentation of percentage utilization, generally indicated at 26; and (ii), a strip or bar chart, generally indicated at 28, indicating the historical activity level over an elapsed period of time. In the illustrative example, the monitoring system 10 (FIGS. 1 and 2) was programmed to present an historic time record for an elapsed period of 90 minutes. More specifically, the system 10 was programmed such that multiplexor/scanner 21 (FIG. 2) scanned the n output lines 22 from the n digital-to-analog integrators 20 every five (5) seconds, with the integrated values for y of the n integrated signal values (here "y" is equal to "6") being displayed at 26 in digital alphanumeric form for each five (5) second scan—i.e., every five seconds the alphanumeric presentations 26 are updated to give the most current five second operating status of each digital test point of interest. That information is continuously stored and such stored values averaged every 45 seconds, with the most recent averaged value being presented as a horizontal bar in the historical strip chart printout 28 at elapsed time "0" in the elapsed minute scale—the length of each such bar presenting a visual representation of percent utilization ranging from zero percent to 100 percent.

Thus, as shown in FIG. 3, the digital test point associated with CPU "3033E" (the second vertical column from the left as viewed in the drawing) reflects in alphanumeric digital format a current activity level of 78% with a fairly stable historical activity level over the preceding 90 minute interval ranging from about 70% to about 90%; while the presentation for the digital test point associated with CPU "3033R" (the fourth vertical column from the left as viewed in the drawing) reflects a current activity level of 96% at 26 and a widely varying historical activity level at 28 ranging from about 25% at time "0" minus about 18 minutes (indicated generally at 29 in FIG. 3) to about 100% at time "0" minus about 69 minutes (indicated generally at 30 in FIG. 3). Since the system 10 further permits of annotation with such entries as date, generally indicated at 31, time-of-day, generally indicated at 32, and other meaningful operator messages and/or information (shown generally at, e.g., 34 and 35), the observer can, merely by glancing at the CRT screen, instantly ascertain the current operating status of six different digital test points as reflected in alphanumeric digital format at 26, and the trend information for each of those six digital test points during the preceding 90 minute interval. Any given variation from an expected normal averaged utilization factor may be explained by such anticipated factors as lunch or coffee breaks; or, alternatively, may be indicative of some undesired abnormality requiring further investigation and correction.

For example, referring to the left-hand column of information in FIG. 3 representative of the activity level for CPU "N3033C", it will be observed that during most of the preceding 90 minute period, the associated digital test point exhibited an activity level on the order of about 40%; but, at about time "0" minus 18 minutes (indicated generally at 36)—i.e., at about 10 o'clock a.m. (Cf., time-of-day indicated at 32)—the activity level began to drop off gradually, reaching a low point of perhaps less than 10% only a few minutes earlier. The sudden increase in the activity level to a current level of 26% may, therefore, be indicative that corrective action had been taken to overcome some undesired irregularity; or, alternatively, that the operator of that particular CPU had returned to work from a 15 minute coffee break.

In practice, it has been found that the present invention permits digital display of the foregoing general type for y discrete independent digital test points where "y" may be any whole integer ranging from "1" to on the order of "8". However, the particular number of information channels included in any given display may, of course, vary widely dependent upon the nature of the information being displayed, the particular CRT employed, and the accuracy and resolution required. The number of information channels to be presented on any given CRT is controlled by the operator through programming of the microprocessor controlled central processor 24 (FIG. 2) via entries made through keyboard 12 (FIG. 1); as is the particular one(s) of the n digital test points 16 (FIG. 2) which (are) displayed, and the time frame employed. For example, if in the exemplary display shown in FIG. 3, the operator had chosen to display an historic record of only 30 minutes duration, then each bar in the historic strip chart would have represented an average of three successive five second scans of the respective integrated signal values during the preceding 15 second period.

Figure 4:
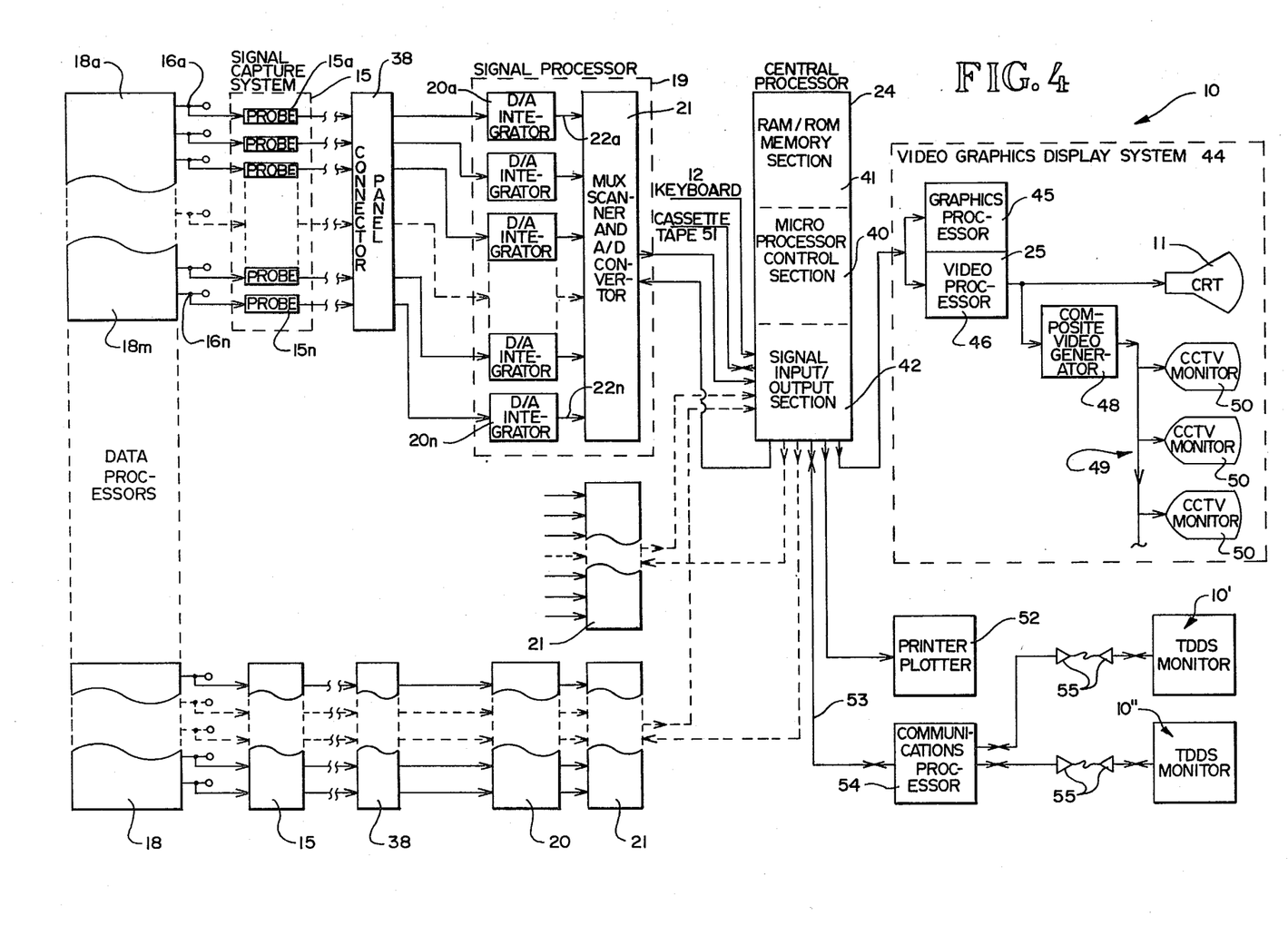
FIG. 4 is a detailed block diagram of the exemplary form of the invention shown in FIGS. 1 and 2, here illustrating particularly the flow of signal information derived from multiple digital test points through a signal processor under the control of a microprocessor controlled central processor into a video graphics display system which permits local and/or remote direct display on a CRT, as well as remote display on a multiplicity of CCTV monitors, and illustrating also alternative provisions for generating hardcopy and/or for interconnecting the monitoring system of the present invention with other identical systems by means of a telecommunications network.
Figure 5:
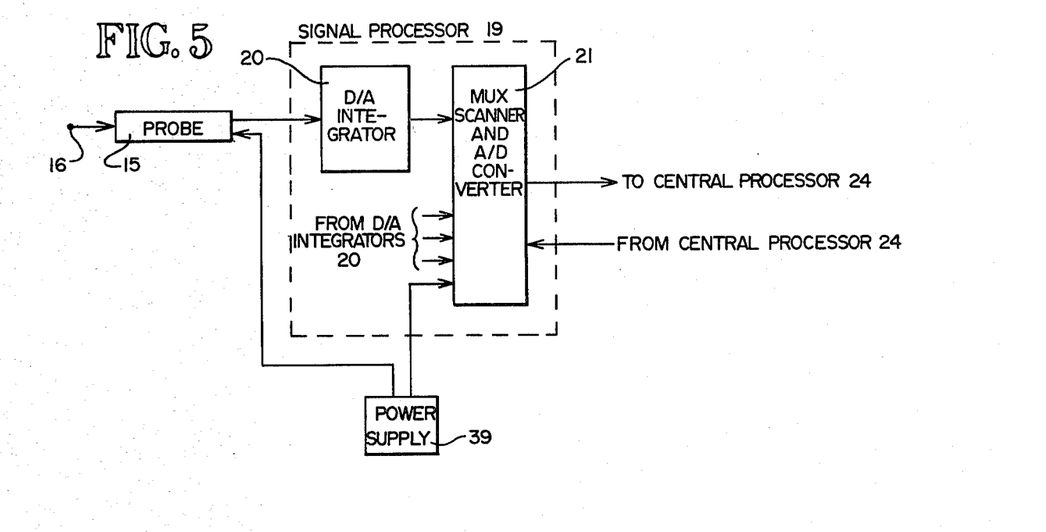
FIG. 5 is a block diagram illustrating specific details of the exemplary signal processor section of the present invention; and, FIG. 6 is a schematic diagram depicting an exemplary passive digital-to-analog integrator that can be used in the signal processing section of the exemplary form of the invention.
Figure 6:
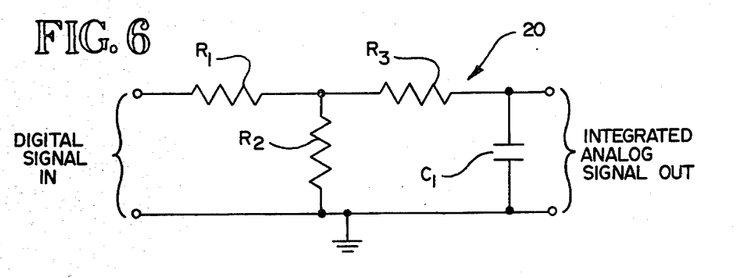

With the foregoing generalized description of the present invention in mind, reference is made to FIG. 4 illustrating in considerably greater detail—albeit, still in block form—an overall exemplary TDDS monitor 10 embodying the features of the present invention. Thus, as here depicted it will be noted that the exemplary monitoring system 10 is adapted to be interconnected to n digital test points $16_a$-$16_n$ associated with m data processors (wherein "n" and "m" can be any desired whole integers) using n high impedance probes $15_a$-$15_n$ which are respectively interconnected through a connector panel 38 preferably located at the rear of cabinet 14 (FIG. 1) to respective different ones of n-digital-to-analog integrators $20_a$-$20_n$. As previous indicated, and as best observed by reference to FIGS. 4, 5 and 6 conjointly, the high impedance probes 15 are completely conventional off-the-shelf devices, each comprising a high impedance active circuit using operational amplifiers and/or field effect transistors to achieve its impedance characteristics. The probes 15 receive power for operation from a power supply 39 (FIG. 5) which may comprise a separate power supply or which may be the power supply for the TDDS monitoring system 10. In the illustrative form of the invention as shown in FIG. 5, power supply 39 also serves to provide power for the multiplexor/scanner and analog-to-digital converter 21. As a consequence of the foregoing, the signal capture probes 15 impose no physical load on either the digital test points 16 or the data processor(s) or other equipment 18 with which the digital test points are associated.

The arrangement is such that each high impedance probe $15_a-15_n$ provides an input signal in the form of a digital wave front acquired from respective ones of the digital test points $16_a-16_n$ which is fed directly to a respective one of each of n digital-to-analog integrators $20_a-20_n$ (FIG. 4). Preferably, but not necessarily, each digital-to-analog integrator 20 is a passive integrator comprising an R-C network such, for example, as the circuit 20 shown in FIG. 6. Thus, the function of the digital-to-analog integrating circuit 20 is to integrate the digital signal acquired from the digital test point 16 into a waveform which has a representative value proportional to the area under the curve of the digital waveform with a relatively slow time constant. Such devices are well known in the art and are available from numerous sources. Briefly, each passive integrator may simply comprise a resistor-capacitor network that is impedance matched to the high impedance probe being utilized. Resistors $R_1$ and $R_2$, although not essential, may be employed to reduce the voltage level of the digital signal by a prescribed amount. The resistor $R_3$ and capacitor $C_1$ are selected to define a desired time constant. For example, in the exemplary system herein described, a time constant of approximately 1.0 seconds was employed. However, other time constants, both fixed and variable ranging from about 0.1 seconds to about 10.0 seconds might be selected dependent upon the particular probes employed, the particular system requirements, and the resolution and accuracy desired. Moreover, the digital-to-analog integrator 20 need not be a passive integrator.

In carrying out the invention, the thus integrated analog signal values associated with the n digital test points $16_a-16_n$ are input to a multiplexor/scanner and analog-to-digital converter 21 via respective ones of lines $22_a-22_n$. The particular multiplexor/scanner 21 employed is again completely conventional in construction and may be purchased as an off-the-shelf item. In the interest of economy, however, it has been determined that excellent results can be obtained where the device 21 comprises a Model CMC AIM16 Analog Input Module of the type offered for sale by Connecticut Micro Computer, Inc., of Brookfield, Conn.; a unit which is capable of scanning up to 16 analog input signal values (i.e., the integrated signal values derived from the digital-to-analog integrators $20_a-20_n$ where "n" equals "16") under the control of a microprocessor controlled central processor 24 and converting the integrated analog signal values to digital signal values which comprise outputs from signal processor 19. In those instances where the TDDS monitor 10 of the present invention is employed to monitor more than sixteen digital test points 16, it is merely necessary to use two or more modules 21 as shown in FIG. 4 or, alternatively, one might select a functionally equivalent device having greater capacity and which is, therefore, somewhat more expensive. In the exemplary system, the arrangement is such that the multiplexor/scanner 21 is exercised by command signals from the microprocessor controlled central processor 24 and serves to scan and sample n analog signals on lines $22_a-22_n$ every five (5) seconds on a per channel basis, generating an 8-bit digital byte representative of the voltage seen at the time of sampling, with such 8-bit digital bytes being transmitted to the central processor 24.

In keeping with the invention, the exemplary microprocessor controlled central processor 24 is again selected from commercially available off-the-shelf equipment capable of meeting system requirements, but which is relatively economical. It has been found in the practice of the invention that particularly excellent results are attained when the central processor 24 comprises a Model CPU 2001 16N, Tape 2N, processor of the type offered for sale by Commodore Business Machines, Inc. of Santa Clara, Calif. This processor is a microcomputer based system employing an MOS Technology 6502 microprocessor chip; and, is capable of controlling the capture of the converted digital signals output from the multiplexor/scanner and analog-to-digital converter 21 and processing such signals into a form suitable for driving a number of CRT monitors. More specifically, the exemplary central processor 24 includes a microprocessor control section 40, a RAM/ROM memory section 41, and a signal input/output section 42 (FIG. 4). The aforesaid conventional Commodore Business Machines Model CPU 2001 16N, Tape 2N, provides the following capabilities, inter alia:

(a) one parallel input/output port with handshaking;

(b) one parallel input/output port supporting IEEE 488 protocol;

(c) internal clocks and timers providing automatic time-of-day clock retrievable and displayable via software;

(d) magnetic tape storage of programs and/or data in a format appropriate for easy retrieval;

(e) alphanumeric keyboard input for data entry or program development;

(f) appropriate circuitry to support a local CRT driven directly from the microprocessor input/output section and to support a composite video generator subsystem; and, (g) firmware support (e.g., "BASIC" language) with capability to support assembly language calls for programs feeding the graphics generator. The foregoing features are contained in 16384 bytes of memory configured in commonly available RAM chips (semiconductors of 16384 bit capacity). The control firmware drives the CRT monitor; provides memory access; runs the "BASIC" or other language interpreter; accesses the keyboard, controls the CRT cursor positioning; and, controls screen editing functions. As previously indicated, the keyboard 12 (FIGS. 1 and 4) is used to initiate data entry of operating programs and to provide password data entry to prohibit unauthorized access to the system.

In operation, the acquired and processed n signal values are, under the control of the central processor 24, input to a video graphis display system, generally indicated at 44 in FIG. 4; and, more specifically, into a graphics generator 25 comprising a graphics processor 45 and video processor 46. In the exemplary form of the invention, graphics generator 25 comprises a conventional off-the-shelf device offered for sale by Micro Technology Unlimited and known as a Model K-1008-6 Integrated Visible Memory. Operator instructions programmed in the central processor 24 serve to control the entry of the acquired and processed n signal values into the graphics processor 45 which comprises an 8192 byte subsystem using dynamic semiconductor memory hips. The contents of the graphics processor 45 represent a bit for bit mapping onto the face of the CRT display 11. Such display is constructed of conventional raster generated dot graphics with a resolution of 320 pixels by 200 pixels, although such resolution is not to be considered limiting and may be expanded dependent upon the capacity of the particular graphics processor employed. The dot information is converted into a video waveform which is compatible with the CRT 11. Additionally, the graphics generator 25, through video processor 46, serves to generate a composite video signal compatible with the RS170 composite video type signals used to drive the CRT monitors. The signals used to drive the CRT display are digitally switchable via software control such that the central processor 24 may select either graphics and/or normal program development display.

If desired, output signals from the video processor 46 may, in addition to being fed to CRT 11, also be fed to a composite video generator 48 which serves to convert horizontal sync, vertical sync and video signals to RS170 format compatible for use with a remote monitor string, indicated generally at 49. In the exemplary form of the invention, the composite video generator 48 comprises a conventional off-the-shelf module of the type offered for sale by California Computer Systems of Santa Clara, Calif. as its Model P 5724AB Video Buffer.

The exemplary remote monitor string 49 comprises a conventional closed circuit TV network which, in the exemplary form of the invention, employs a plurality of 23 inch television monitors so connected via a daisy chained coaxial cable system. The conventional television monitors 50 may, for example, be of the type offered for sale by Electrohome Limited of Kitchener, Ontario, Canada under the designation EVM 23AG Television Monitors. Thus, it will be appreciated that the present invention permits of incorporation in a system which may be continuously monitored at multiple locations which need not be proximate to the TDDS monitoring system 10 of the present invention.

As thus far described, it will be appreciated that the acquired and processed n signal values may be selectively displayed in digital format on one or more living CRT type displays. In the practice of the invention, the signals output to the video graphics display system 44 may be simultaneously output to a cassette tape storage system 51 (FIG. 4) which permits the digital storage of 8-bit ASCII data and BASIC (or other language) program information in reliable and easy to retrieve format. Thus, the cassette tape may be controlled by the central processor 24 so as to permit recording of acquired and processed digital data for future reference. Alternatively, or concomitantly, output signals from the central processor may also be conveyed on manual command directly to a conventional printer/plotter 52 for permanent display in the form of hardcopy.

Thus far, the present invention has been described in connection with a monitoring system 10 which functions as a Master monitoring system—that is, a system in which data is collected directly on a continuous basis, processed, and fed to a suitable video graphics display system or the like. However, the present invention readily permits of usage in an overall system in which the central processor 24 of the TDDS monitoring system 10 may be slaved to another identical system remotely located. To this end, and as best illustrated by reference to FIG. 4, it will be noted that a bi-directional input/output line 53 is provided which serves to interconnect the signal input/output section 42 of the central processor 24 to a communications processor 54 which may be of conventional construction such, for example, as a Model TNW 232D Dual IEEE To RS 232 Interface of the type offered for sale by TNW Corporation of San Diego, Calif.

The exemplary communications processor 54 is exercised via microprocessor instructions from the central processor 24 to permit transmission of processed data to, and/or receipt of processed data from, one or more identical but remotely located TDDS monitoring systems 10', 10'' which also embody the features of the present invention. To this end, communications processor 54 serves to convert signals in IEEE 488 protocol to asynchronous RS 232 signals which can be readily transmitted via a telecommunications network between the systems 10, 10' and 10'' using conventional Bell 103 or Bell 212 compatible modems (modulator/demodulator) 55. Central processor 24 protocol is such that all monitoring systems 10, 10' and/or 10'' can be used either locally with probes 15, remotely as a slave, or a combination thereof.

Thus, those skilled in the art will appreciate that there has herein been described a simple, economical, yet highly effective and reliable monitoring system constructed essentially of conventional off-the-shelf low cost components which are easily assembled to produce a monitoring system capable of displaying selected channels of information representative of the activity levels of selected ones of multiple digital test points in digital format both in pseudo real time alphanumeric format and in historical strip or bar chart digital format over a selected time interval so to permit display of trend information together with current operational information for a plurality of digital test points simultaneously in a single living display. The monitoring sysem is highly flexible and permits of local and remote display and/or interconnection with one or more identical monitoring systems located remotely, with any selected one or ones of such systems functioning as master and/or slave. All variables are manipulated by the microprocessor based central processor 24 pursuant to programmed instructions in the RAM/ROM memory section 41 (which may, of course, be modified and/or supplemented by appropriate data entered manually via keyboard 12). The central processor 24 receives and processes data from the multiplexor/scanner and analog-to-digital converter 21 to form a signal value indicative of the desired time averaged value which is then displayed in one or more of the formats described above.

It will further be understood that the central processor 24 is designed such that the communications capability of the TDDS monitoring system 10—e.g., its ability to "talk" to other identical TDDS monitoring systems 10', 10'' (FIG. 4)—is manually selected by suitable keyboard entry instructions; and, therefore, may be readily reconfigured to meet desired or requisite operational needs. Similarly, the time periods involved are determined automatically by the program or via manual instruction from keyboard 12 (FIGS. 1 and 4). Finally, the decision to allocate any given data information channel sensed by the probes 15 to any particular display is controlled by the central processor and may be readily changed under a manual keyboard control.

What is claimed is:

1. The method of visually and simultaneously displaying data representative of one or more operational parameters embedded in v discrete independent digital test points where "v" is any selected whole integer from "1" to on the order of "8" comprising the steps of: establishing v adjacent generally parallel discrete independent data information channels on a visual display medium; reproducing v first digital entries representative of the current operational status in pseudo real time for each of the v digital test points in respective different ones of the v channels; reproducing a series of successive parallel digital bars disposed in strip chart format in each of the v channels with each successive bar digitally representative of a past operational status for the particular selected digital test point associated with that channel and averaged over a stated time interval with the most current bar indicative of the stated time interval most proximate the first digital current entry and with each successive bar indicative of the next most proximate stated time interval, and where all of the bars in each of the v channels define a digital strip chart indicative of the historic operational status of the parameter embedded in the particular digital test point associated with that channel over a preselected period of time.

2. The method as set forth in claim 1 wherein the visual display medium is a CRT screen.

3. The method as set forth in claim 1 wherein the visual display medium is a video monitor.

4. The method as set forth in claim 1 wherein the visual display medium is a printed sheet defining a hardcopy permanent record.

5. The method as set forth in claims 1, 2, 3 or 4 wherein all data entered on the display medium is recorded on magnetic tape.

6. The method as set forth in claims 1, 2, 3 or 4 wherein all data entered on the display medium is simultaneously displayed on a plurality of display media at different locations.

7. The product produced by the method as set forth in claims 1, 2, 3 or 4.

8. The method as set forth in claim 1 wherein the v first digital entries representative of the current operational status in pseudo real time for each of the v digital test points are displayed in alphanumeric form.

9. The method as set forth in claims 1 or 8 wherein the v first digital entries representative of the current operational status in pseudo real time for each of the v digital test points are periodically updated so as to continuously present current pseudo real time digital information representative of the current operational status of the information embedded in the v digital test points.

10. The method as set forth in claim 9 wherein the v first digital entries are updated on the order of every five seconds.

11. The method as set forth in claim 1 wherein the stated time interval is in the range of five seconds to on the order of forty-five seconds.

12. The method as set forth in claim 1 wherein the stated time interval is in the range of five seconds to on the order of forty-five seconds and the preselected period of time is in the range of ten minutes to on the order of ninety minutes.

13. The method as set forth in claims 11 or 12 wherein the v first digital entries are updated on the order of every five seconds.

14. The method as set forth in claim 1 including the further step of entering alphanumeric information on the display medium representative of at least one of real time-of-day and date.

15. The method as set forth in claims 1 or 14 including the further step of entering alphanumeric information on the display medium which identifies each of the v digital test points.

16. The method as set forth in claims 1 or 14 including the further step of entering operator messages on the display medium in alphanumeric form.

17. A display for visually and simultaneously presenting v discrete independent channels of information corresponding to digital information embedded in v different digital test points where "v" is any selected whole integer from "1" to on the order of "8", comprising a display medium containing v adjacent generally parallel information channels with each of said channels including (i) a first digital representation of the current operational status in pseudo real time of a particular selected digital test point and (ii) a second digital representation in strip chart format indicative of the historic status of said selected digital test point over a preselected period of time.

18. A display as set forth in claim 17 wherein said display medium is a CRT screen.

19. A display as set forth in claim 17 wherein said display medium is a video monitor.

20. A display as set forth in claim 17 wherein said display medium is a printed sheet defining a hardcopy permanent record.

21. A display as set forth in claims 17, 18, 19 or 20 wherein said first digital representation is in alphanumeric format.

22. A display as set forth in claims 17, 18, 19 or 20 further including alphanumeric information on said display medium representative of at least one of real time-of-day and date.

23. A display as set forth in claims 17, 18, 19 or 20 further including alphanumeric information on said display medium which identifies each of said v digital test points.

24. A display as set forth in claims 17, 18, 19 or 20 further including alphanumeric operator messages on said display medium.

25. A display as set forth in claims 17, 18, 19 or 20 wherein said display medium comprises a living dynamic display in which said first digital representation is periodically updated so as to continuously present the current pseudo real time operational status for each of said v digital test points.

26. A display as set forth in claims 17, 18, 19 or 20 wherein said display medium comprises a living dynamic display in which said second digital representation in each of said v channels comprises a series of successively entered parallel bars each having a length proportional to the average operational status of the digital information embedded on one of said v digital test points during stated successive time intervals.

27. The method of continuously monitoring v discrete independent digital test points and displaying data in digital format representative of one or more operational parameters embedded in respective different ones of the v digital test points where "v" is any selected whole integer from "1" to on the order of "8" comprising the steps of:

(a) establishing v adjacent generally parallel discrete independent information channels on a display medium;

(b) continuously monitoring the v digital test points and producing v analog signal values proportional to the values of the parameter embedded in the v digital test points;

(c) repetitively scanning the v analog signal values produced in step (b) and converting the data to v digital representations of the current pseudo real time operational status of the parameter embedded in the v digital test points;

(d) entering the v digital representations of the current pseudo real time operational status of the parameter embedded in the v digital test points successively in respective different ones of the v information channels in digital format representing the current pseudo real time operational status of each of the v digital test points;

(e) periodically updating the entries made in step (d) so as to continuously present on the display medium current pseudo real time digital information representative of the current operational status of the information embedded in the v digital test points;

(f) averaging successive ones of the v digital representations of the current pseudo real time operational status generated for each of the v information channels in step (c) to produce v digital indications of the average values of the operational status over a first preselected time interval and entering such v digital indications in respective different ones of the v information channels on the display medium in bar format;

(g) scrolling the v bar indications entered on the display medium in step (f) downwardly with respect to the data entered in steps (d) and (e) and entering in each of the v information channels updated digital bar information representative of the average values of the operational status of each digital test point over successive first time intervals whereby a plurality of successively entered digital bar entries for each of the v information channels define v strip charts respectively and digitally indicative of the historic operational status of the associated digital test point over a period of time equal to a preselected multiple of the first time interval; and, (h) scrolling the oldest of the v bar indications off the display medium as the most recent v bar indications produced in step (f) are entered on the display medium in step (g) so as to produce a living display containing (i) the most recent updated entries of current pseudo real time digital information produced in step (e) for each of the v channels and (ii) v historical strip charts representative of the most recent historical operational status for each of the v digital test points over the period of time established in step (g).

28. The method of continuously monitoring n discrete independent digital test points, where "n" is any whole integer, and displaying data in digital format representative of one or more operational parameters embedded in selected respective different ones of v of the n digital test points, where "v" is any selected whole integer from "1" on the order of "8", comprising the steps of:

(a) establishing v adjacent generally parallel discrete independent information channels on a display medium;

(b) continuously monitoring the n digital test points and producing n analog signal values proportional to the values of the parameter embedded in the n digital test points;

(c) repetitively scanning the n analog signal values produced in step (b) and converting the data to n digital representations of the current pseudo real time operational status of the parameters embedded in the n digital test points;

(d) entering any selected v of the n digital representations of the current pseudo real time operational status of the parameter embedded in the corresponding v digital test points successively in respective different ones of the v information channels in digital format representing the current pseudo real time operational status of each of the selected v digital test points;

(e) periodically updating the entries made in step (d) so as to continuously present on the display medium current pseudo real time digital information representative of the current operational status of the information embedded in the selected v digital test points;

(f) averaging successive ones of the selected v digital representations of the current pseudo real time operational status generated in step (c) for each of the selected v information channels to produce v digital indications of the average values of the operational status over a first preselected time interval and entering such v digital indications in respective different ones of the v information channels on the display medium in bar format;

(g) scrolling the v bar indications entered on the display medium in step (f) downwardly with respect to the data entered in steps (d) and (e) and entering in each of the v information channels updated digital bar information representative of the average values of the operational status of each of the selected v digital test points over successive first time intervals whereby a plurality of successively entered digital bar entries for each of the v information channels define v strip charts respectively and digitally indicative of the historic operational status of the associated digital test point over a period of time equal to a preselected multiple of the first time interval; and, (h) scrolling the oldest of the v bar indications off the display medium as the most recent v bar indications produced in step (f) are entered on the display medium in step (g) so as to produce a living display containing (i) the most recent updated entries of current pseudo real time digital information produced in step (e) for each of the v channels and (ii) v historical strip charts representative of the most recent historical operational status for each of the selected v digital test points over the period of time established in step (g).

29. The method as set forth in claims 27 or 28 wherein the display medium is a CRT screen.

30. The method as set forth in claims 27 or 28 wherein the display medium is a video monitor.

31. The method as set forth in claims 27 or 28 wherein the display medium is a printed sheet defining a hardcopy permanent record.

32. The method as set forth in claims 27 or 28 wherein all data entered on the display medium is recorded on magnetic tape.

33. The method as set forth in claims 27 or 28 wherein all data entered on the display medium is simultaneously displayed on a plurality of display media at different locations.

34. The display medium product produced by the method as set forth in claims 27 or 28.

35. The method as set forth in claims 27 or 28 wherein the entries made in steps (d) and (e) are in alphanumeric format.

36. The method as set forth in claims 27 or 28 wherein the entries made in step (d) are updated in step (e) on the order of every five seconds.

37. The method as set forth in claims 27 or 28 wherein the first preselected time interval set forth in step (f) is in the range of five seconds to on the order of forty-five seconds.

38. The method as set forth in claims 27 or 28 wherein the first preselected time interval set forth in step (f) is in the range of five seconds to on the order of forty-five seconds and the period of time set forth in step (g) is in the range of ten minutes to on the order of ninety minutes.

39. The method as set forth in claims 27 or 28 wherein the entries made in step (d) are updated in step (e) on the order of every five seconds, the first preselected time interval set forth in step (f) is on the order of forty-five seconds, and the period of time set forth in step (g) is on the order of ninety minutes.

40. The method as set forth in claims 27 or 28 including the further step of entering alphanumeric information on the display medium representative of at least one of real time-of-day and date.

41. The method as set forth in claims 27 or 28 including the further step of entering alphanumeric information on the display medium which identifies each of the v digital test points.

42. The method as set forth in claims 27 or 28 including the further step of entering operator messages on the display medium in alphanumeric form.

43. Monitoring apparatus for detecting digital information representative of operational parameters embedded in n digital test points and for displaying data digitally representative thereof on a visual display medium, where "n" is any whole integer, comprising, in combination:
   (a) n signal capture means including n channel input ports for acquiring n digital signal values from respective ones of said n digital test points;
   (b) signal processing means including (i) n means for integrating said n digital signal values and producing n analog output signals respectively proportional to the integrated values of said n signal values, and (ii) means for scanning said n analog output signals;
   (c) signal storage means including x memory devices where "x" is any whole integer multiple of n;
   (d) means for conveying data representative of said n analog output signals to said storage means for accumulating said data representative of signals emanating from said n digital test points in n respective different ones of said x memory devices with said accumulated data being quantitatively indicative of the operational parameter embedded in each of said n digital test points;
   (e) a video graphics generator including means for visually and simultaneously displaying accumulated stored data on (i) a pseudo real time basis and (ii) an historical basis over a selected period of time with said displayed data being digitally representative of the operational parameters embedded in v of said n digital test points where "v" is any whole integer from "1" to on the order of "8"; and,
   (f) means for coupling said video graphics generator to v of said x memory devices for simultaneously visually displaying data stored in v of said x memory devices on a display medium in v discrete independent channels on a pseudo real time digital basis and on an historical digital basis over a selected period of time.

44. In a system for displaying selected parameters indicative of percent utilization of m data processing systems or the like, where "m" is equal to any whole integer, and of the type including n signal capture means, n signal processing means, signal storage means, and signal display means, where "n" is equal to any whole integer, monitoring apparatus wherein:
   (a) said n signal capture means include n channel input ports for acquiring n digital signal values from respective ones of n digital test points associated with said m data processing systems;
   (g) said n signal processing means include means for integrating said n digital signal values and producing n analog output signals respectively proportional to the integrated values of said n signal values;
   (c) means for scanning said n analog output signals;
   (d) said signal storage means include x memory devices where "x" is any whole integer multiple of n;
   (e) means for conveying data representative of said n analog output signals to said storage means for accumulating said data representative of signals emanating from said n digital test points in n respective different ones of said x memory devices with said accumulated data being quantitatively indicative of the percent utilization of each of said n digital test points in said m data processing systems;
   (f) a video graphics generator including means for visually and simultaneously displaying accumulated stored data on (i) a pseudo real time basis and (ii) an historical basis over a selected period of time with said displayed data being digitally representative of the percent utilization of v of said n digital test points in said m data processing systems where "v" is any whole integer from "1" to on the order of "8"; and,
   (g) means for coupling said video graphics generator to v of said x memory devices for simultaneously visually displaying data stored in v of said x memory devices on a display medium in v discrete independent channels on a pseudo real time digital basis and on an historical digital basis over a selected period of time.

45. Monitoring apparatus as set forth in claims 43 or 44 wherein said n signal capture means comprise high impedance probes.

46. Monitoring apparatus as set forth in claims 43 or 44 wherein said means for integrating said n digital signal values comprise n passive digital-to-analog integrators.

47. Monitoring apparatus as set forth in claims 43 or 44 wherein said means for integrating said n digital signal values comprise n digital-to-analog integrators having a time constant in the range of 0.1 seconds to on the order of 10.0 seconds.

48. Monitoring apparatus as set forth in claim 47 wherein said time constant is on the order of 1 second.

49. Monitoring apparatus as set forth in claims 43 or 44 wherein said means for scanning said n analog output signals comprises multiplexor/scanner and analog-to-digital converter.

50. Monitoring apparatus as set forth in claim 49 wherein said multiplexor/scanner and analog-to-digital converter successively and periodically scans said n analog output signals on a per channel basis and repetitively produces n digital output signals proportional in value to the average values of successive ones of said n analog output signals during a preselected time interval on the order of up to about five seconds.

51. Monitoring apparatus as set forth in claims 43 or 44 wherein said storage means and said means for conveying data are contained within a microprocessor controlled central processor.

52. Monitoring apparatus as set forth in claim 51 further including a keyboard operatively connected to said central processor for initiating data entry to and/or program modification of said central processor.

53. Monitoring apparatus as set forth in claim 51 further including a magnetic tape operatively connected to said central processor for receiving data from and transmitting data to said central processor.

54. Monitoring apparatus as set forth in claim 51 further including a keyboard and a printer/plotter operatively connected to said central processor for permitting routing of data stored in said central processor to said printer/plotter in response to keyboard commands so as to generate printed hardcopy displays of accumulated stored data on (i) a pseudo real time basis and (ii) an historical basis over a selected period of time with said displayed data being digitally representative of an operational parameter embedded in v of said n digital test points.

55. Monitoring apparatus as set forth in claims 43 or 44 further including a composite video generator operatively connected to said video graphics generator and at least one remote video monitor coupled to said composite video generator for simultaneously displaying on said remote video monitor the same data in the same format as is displayed on said display medium.

56. Monitoring apparatus as set forth in claims 43 or 44 wherein said display medium is a CRT screen.

57. Monitoring apparatus as set forth in claims 43 or 44 wherein said selected period of time is in the range of about ten minutes to on the order of about ninety minutes.

* * * * *